S. DAVIDSON.
EMERGENCY TIRE.
APPLICATION FILED OCT. 24, 1912.
1,110,904.
Patented Sept. 15, 1914.
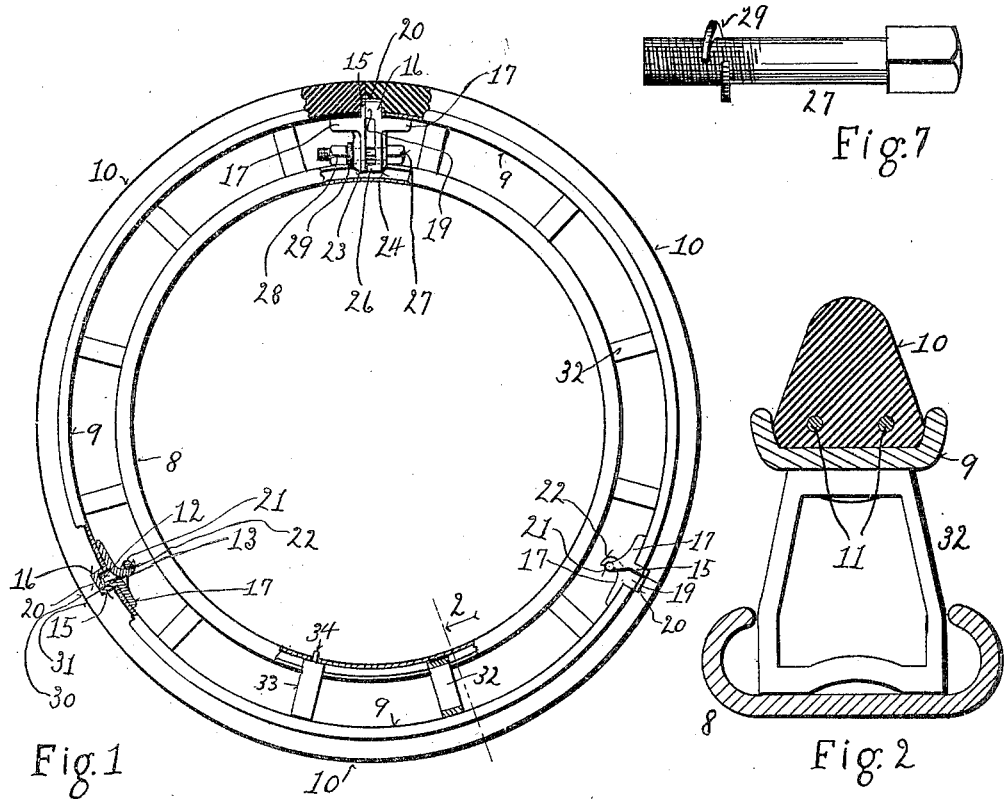
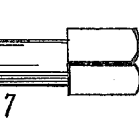
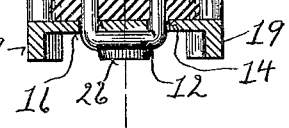
Witnesses
Inventor
Samuel Davidson
By J. A. Rosen
Atty

UNITED STATES PATENT OFFICE.

SAMUEL DAVIDSON, OF DETROIT, MICHIGAN.

EMERGENCY-TIRE.

1,110,904.

Specification of Letters Patent. Patented Sept. 15, 1914.

Application filed October 24, 1912. Serial No. 727,479.

*To all whom it may concern:*

Be it known that I, SAMUEL DAVIDSON, a citizen of the United States, residing at Detroit, in the county of Wayne and State of Michigan, have invented certain new and useful Improvements in Emergency-Tires, of which the following is a specification.

This invention relates to emergency tires for automobiles, the general purposes and principles involved in the general class being set forth at length in my prior patents No. 1,052,801, dated February 11, 1913, and No. 1,070,670, dated August 19, 1913.

My present invention is a sectional emergency tire.

Its object is to provide a simple, strong, light, and durable sectional emergency tire, made up of a number of sections that may be quickly and easily attached to and detached from each other and to and from the wheel rim.

A further object is so to design the parts that each section may comprise a segmental steel channel provided with suitable brackets seated in the wheel rim, a segmental solid rubber tire seated in the channel, with special means for securing the rubber tire or tread in the channel, for securing contiguous ends of adjacent sections together, and for finishing the connections so as to have in effect a continuous rubber tread when the emergency tire is placed upon the wheel rim. The invention comprises the parts, improvements, and combinations hereinafter set forth and claimed.

In the drawings accompanying and forming part of this specification and in the description of the drawings I have shown my invention in its preferred form and what I deem to be the best mode of applying the principles thereof; but it is to be understood that within the scope of the appended claims I contemplate changes in form, proportions, and materials, the transposition of parts, and the substitution of equivalent members, without departing from the spirit of my invention.

Figure 1 is a side elevation of a sectional emergency tire made in accordance with the principles of my invention, applied to a wheel rim, some of the parts being shown in section. Fig. 2 is a cross section of the tire and rim on a plane indicated by the line 2 in Fig. 1. Figs. 3 and 4 are views of the contiguous ends of the two sections that are bolted together to lock the tire on the rim. Fig. 5 is a sectional plan of the parts shown in Fig. 4 on a plane indicated by the line 5. Fig. 6 is a sectional plan of the parts shown in Fig. 3 on a plane indicated by the line 6. Fig. 7 is a view of the draw-bolt with the lock-washer.

Similar reference characters indicate similar parts throughout the several views.

8 is an automobile wheel rim of the clencher type with integral flanges. Although my present invention may be used with any kind of rim, I have shown this special type for the reason that my present invention is adapted to be used upon it, while the specific forms shown in my prior patents are not.

9, 9, 9 are a complementary series of segmental steel channels, each carrying a corresponding segment 10 of solid rubber tire. The tire may be divided into any suitable number of segments. I prefer to divide it into three segments, however, for the reason that I find that by so doing the segments can be stowed away under the automobile seat. The wire or rod 11 usually provided for holding the rubber tread in its seat or channel is here made of one continuous wire or rod bent over at 12, making a U-shaped retaining rod for each section of the tire. The opposite ends of each channel are closed by plates 15 and 16 respectively and through each plate are two holes 14 for the reception of the retaining rod. The connecting portion 12 bears against the end plate 16, and the free ends are threaded and nuts 13, 13 are screwed thereon which bear against the opposite end plate 15. By this means I am able to secure the tread member firmly seated in the channel; and, if desired, the rubber tread member may be replaced when worn out by removing the retaining rod. The tips of the free ends may be clenched to prevent the nuts from accidentally becoming unscrewed. The end plates are secured to the channel by any suitable means, as by the peripheral extensions 17, 17 secured by rivets 18, 18. The face of the end plates 15 against which the nuts bear is flat so that a socket wrench or other suitable tool may be applied to tighten the nuts. The other end plate, 16, is formed with a peripherally projecting rib around its top and sides, as shown at 20, 19, 19, forming a hood, which is adapted to butt against the contiguous end plate 15 of an adjacent section. This hood protects the otherwise exposed ends and nuts of the retaining rod and conceals them from view. The end plates and the hood do not extend out radially to the periphery of the rubber tread member; but the ends of the tread members are rabbeted so as to form lips 30, 31 which are supported on said end plates and hood, as upon a ledge. In practice the rubber tread members are cut a little over-length, so that when the sections are assembled the ends will come together with some degree of pressure, thus preventing a gap, and forming in effect a continuous tread.

Each end plate is formed with an integral inwardly extending means for interlocking the contiguous ends of adjacent sections together. Two of these connections are made up of interlocking loops 21 and hooks 22, which permit the sections to be detachably secured together. At the third connection there are the two inwardly extending lugs 24 and 23, each formed with a bolt-hole 25, and the lug 24 being formed with a small lug 26 bearing against the opposite extension 23. The bolt 27 is passed through the bolt-holes, a lock-washer 29 is placed thereon, and then the nut 28 is screwed thereon. By means of this draw-bolt the connection may be made easily, quickly, and securely; the small lug 26 affording means, in addition to the rigidity of the other parts, for insuring the square meeting of the hood and opposite end plate.

To each segmental steel channel are secured a number of inwardly extending brackets 32, whose inner ends are formed to fit upon the wheel rim between the flanges thereof; and one of the brackets, 33, in each tire is formed with an inwardly projecting stem 34 which may be placed in the valve-stem hole when the tire is applied to the wheel rim, in order to prevent creeping.

Having thus described my invention, what I claim as new and desire to secure by Letters Patent is:

1. In a sectional emergency tire, the combination of a series of complementary segmental integral steel channels, brackets secured to each channel between the ends thereof and extending inwardly and formed to bear upon a wheel rim, an end plate secured to each end of each channel independently of the brackets and closing said end and having apertures for the reception of tread-retaining rods and also having inward extensions to afford means for interlocking together the contiguous ends of adjacent sections, and the end plate at one end of each segmental channel having a hood comprising a rib projecting lengthwise of the channel and inclosing the top of the outer face of said plate, the plate at the other end of each segmental channel having an outer flat surface, tread-retaining rods extending lengthwise of the respective channels for engaging the respective treads for retaining said treads in their respective channels, said rods having each at one end a head and extending through said apertures, the head of each rod bearing against the end plate having the hooded outer face, and nuts for the other ends of the respective rods, said nuts bearing against the respective flat surfaced end plates, and said segments being arranged so that the hooded end of one engages against the flat end of the adjacent section.

2. In an emergency tire, the combination of a series of complementary segmental integral steel channels, brackets secured to each channel between the ends thereof and extending inwardly and formed to bear upon a wheel rim, a series of complementary tread members seated in the respective channels, end plates secured to the respective ends of said channels independently of said brackets and closing said ends and affording anchorages for tread-retaining rods, each end plate being formed with an integrally formed inward extension affording means for interlocking together contiguous ends of adjacent sections, and tread-retaining rods for the respective channels and tread members, each rod being anchored at its opposite ends to the end plates at opposite respective ends of its steel channel.

In testimony whereof I have affixed my signature in presence of two witnesses.

SAMUEL DAVIDSON.

Witnesses:
EMIL JACOB,
GEO. H. KEICHNER.

---

Copies of this patent may be obtained for five cents each, by addressing the "Commissioner of Patents, Washington, D. C."